United States Patent Office 3,545,998
Patented Dec. 8, 1970

3,545,998,
LOWER ALIPHATIC ALCOHOL TREATMENT OF LIGHT POLARIZING FILM
Harold O. Buzzell, Wollaston, Mass., assignor to Polaroid Corporation, Cambridge, Mass., a corporation of Delaware
No Drawing. Filed Mar. 28, 1968, Ser. No. 716,983
Int. Cl. B44d 5/06, 1/92
U.S. Cl. 117—33.3       2 Claims

ABSTRACT OF THE DISCLOSURE

Uniformity of dyeing of molecularly oriented hydroxyl containing vinyl polymers is increasd bey washing the said oriented polymer with a lower aliphatic alcohol prior to treatment with an electrolyte and subsequent dyeing.

---

This invention relates to a process for providing improved light-polarizing means dyed with a dichroic dye and, more particularly, providing image-bearing film which bears more uniform light-polarizing dichroic dye images.

In U.S. Pat. No. 2,892,382, issued June 30, 1959 to William H. Ryan and Vivian K. Walworth, there is described a process for the treatment of sheets of hydroxyl containing vinyl polymers in oriented or unoriented form, as well as the treatment of the hydroxyl containing vinyl polymer in flake or other form prior to formation of said sheets, with at least one electrolyte, at least one ion of which is selected from the class of anions and cations selected from the lyotropic series and of greater activity in said series than barium or chloride. Subsequently, the treated sheets are dyed with a dichroic dye. In a particularly useful embodiment of that process, a laminar structure comprises two, thin transparent layers of molecularly oriented polyvinyl alcohol mounted upon the opposite sides of a transparent support, such as cellulose acetate butyrate or cellulose triacetate. Each of the oriented polyvinyl alcohol layers is treated with a solution of sodium hydroxide prior to being dyed, uniformly or imagewise, with a dichroic dye. This electrolyte treatment is effective to provide greater dye density and higher dichroic ratios in the final product. Reference may be made to said patent for full details of the electrolyte treatment, it being understood that such disclosure is hereby incorporated into this application.

It has been observed that when oriented hydroxyl containing polymer sheet, such as oriented polyvinyl alcohol laminated to a base material such as cellulose acetate butyrate, was imbibed with a dichroic dye solution; uniformity of dyeing was not always obtained, notwithstanding the electrolyte treatment. Blotches, streaks, and mottles were present on the dyed surface. It was determined that a film-like residue was present on the surface of the hydroxyl containing polymer, the presence of which impaired the operation of the electrolyte treatment. Accordingly, it is one object of this invention to provide a process for the removal of said film.

Another object of this invention is to provide a pretreatment process for sheet stock which is used in the preparation of light-polarizing films for use in the formation of light-polarizing images of photographic quality.

Still another object of this invention is to provide a washing process for a hydroxyl containing vinyl polymer which has its molecules preferably in an oriented condition and when in said condition, is to be utilized for the preparation or polarizing films.

Yet another object is to provide an alcoholic washing process that aids in the production of improved dichroic dye light-polarizing images of a monochromatic or multichromatic nature.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

It has now been found that the above and other objects may be accomplished by treating the exposed surfaces of the molecularly oriented hydroxyl vinyl polymer with an alcoholic wash, prior to the electrolyte treatment.

It was determined that the film on the surface of the oriented hydroxyl polymer is a highly hygroscopic, hazy, ultra thin layer. This hazy surface material is believed to comprise crystallites of the hydroxyl containing vinyl polymer as well as residual wetting, casting and leveling agents used in preparation of the film of the polymer. A typical release agent known to be used in the casting of sheet polyvinyl alcohol and which could comprise a part of the haze is acetyldimethylbenzyl ammonium chloride. A typical wetting agent which could also be present is Triton X–100 (trade name of Rohm and Haas Company for its non-ionic isooctylphenylpolyethoxyethanol dispersing agent).

The haze appears only on the surfaces of the laminate and not at the lamination interface, although this haze may originally have been present on both surfaces of the cast hydroxyl containing vinyl polymer film. When this thin polymeric film, such as one of polyvinyl alcohol, is laminated to a base material, a dope such as completely hydrolyzed polyvinyl alcohol in water is used as the bonding agent. The dope acts to dissolve the crystallites and to rewet the residual casting and leveling agents such that the index of refraction of the material on the surface of the polymer film is the same as the index of refraction of the "interior" of the polymer film, thus eliminating the haze at the laminated interface.

While the removal of the haze can take place either prior to or after orientation of the polyvinyl alcohol, best results are obtained if the alcoholic wash is carried out after orientation, since orientation tends to cause more residual agents to exude to the surface.

It is desirable to remove the haze for several reasons. The most important is that optical transparency of the entire laminate will be improved. Secondly, when the laminate is placed in the electrolyte bath, removal of the haze causing materials is dependent on the solubility of the nonhomogeneous mixture comprising the haze and is usually incomplete. In the areas wherein the haze has not been removed, there is a greater acceptance of imbibed dye such that blotches and streaks will appear in the areas of nonremoval of the haze by the electrolyte bath. This blotchiness and mottling effect is due to the fact that the crystallites of the haze being quite hygroscopic will preferentially absorb imbibed dye resulting in uneven dyeing of the oriented film.

Thirdly, dichroic dye imbibed into the haze areas is not associated with molecularly oriented hydroxyl containing vinyl polymer, and thus polarizing efficiency is reduced.

It has now been determined that an easy, efficient low cost means of removing the above-described haze is to wash the laminate surfaces with an alcohol, followed by a water rinsing, and then drying the laminate such as by passing it over an air knife. It is to be understood that the haze removal treatment is to be carried out prior to the electrolyte treatment.

Any lower aliphatic alcohol can be used in this treatment. Typical examples includes propanol, isopropanol, ethanol and the preferred alcohol, namely methanol.

The treatment can be carried on at any temperature not detrimental to the laminate, but for ease and simplicity, room temperature is preferred.

In practice, wherein a long web of oriented laminate is to be treated, it has been found beneficial to pass the web through a set of wringer rolls after the water rinse, to remove excess water without substantially compressing the laminate prior to its being dried, as by an air knife. The long web is then treated with an electrolyte in accordance with the aforesaid Ryan et al. patent. The dried laminate may then be baked for a short time, preferably at about 180° F. for 30 seconds, in order to prevent self-adhesion (blocking) when the web is wound into rolls.

The invention will be illustrated in greater detail in conjunction with the following specific examples which set forth representative processes and which are not intended to be limiting, but are meant to be illustrative only.

EXAMPLE I

Stretched polyvinyl alcohol laminated to a cellulose acetate butyrate support was passed through a tank containing methanol at room temperature. The laminate was sprayed with water, subjected to wringer rolls and then dried by an air knife. The resulting haze-free laminate was then passed through a tank containing a 20% aqueous sodium hydroxide solution, at a temperature of approximately 56° C. The sodium hydroxide was removed by a water spray, and the laminate again subjected to wringer rolls and an air knife, and then baked at a low temperature. The laminate was placed in a 1.5% phenamine brown dye solution at 65° C. for 25 seconds. A partial red dichroic polarizer having 36% transmission in the middle visual region was obtained.

EXAMPLE II

A 45° stretched polyvinyl alcohol film was applied to both sides of a support in such a manner as to have their respective stretch axes crossed at 90°. After being subjected to the above-described haze removal and sodium hydroxide treatments, one side of the laminate was dyed blue with a 1% solution of diphenyl brilliant blue (GEIGY FF Super) at 45° C. for 25 seconds. The other side is dyed amber with a 2% solution of direct fast orange 4 RL (Blackman Uhler Chemical Co.) at 47° C. for 25 seconds. The resultant laminate was slightly green in appearance. When viewed through a rotating polarizing analyzer, the extinction color of the dyed laminate changed from amber to blue and back to amber. The blue side had a 67% Kv. in the middle visible range, and the amber side 74% Kv.

It will be noted that the density of the imbibed dye is dependent upon several factors; namely, the time the item to be dyed spends in the dye bath, the temperature of the dye solution and the dye concentration.

While all of the above discussion has emphasized the preparation of light-polarizing materials using dichroic dyes, it will be seen that the removal of the haze film by the alcoholic wash treatment gives rise to beneficial results in the situation where light filtering materials are prepared, using a non-dichroic dye.

Whereas the preceding discussion has been directed to a laminate comprising a thin layer of a hydroxyl containing film on a relatively thick support, it will be understood that the discussion and principles involved are equally as applicable to the use of a self-supporting relatively thick layer of the hydroxyl containing vinyl polymer which is not bonded to a base material.

Since certain changes may be made in the above process without departing from the scope of the invention herein involved, it is intended that all matter contained in the above description shall be interpreted as illustrative and not in a limiting sense.

What is claimed is:

1. In the process of preparing light-polarizing film material exhibiting a high dichroic ratio and polarizing efficiency, which process comprises the steps of treating a film of a molecularly oriented hydroxyl containing vinyl polymer with a solution of an electrolyte, at least one ion of which is selected from the class of anions and cations having greater activity in the lyotropic series than barium or chloride, and thereafter dyeing said oriented polymer with a dichroic dye, the improvement comprising the step of washing said oriented film with a lower aliphatic alcohol selected from the group consisting of methanol, ethanol, propanol and isopropanol prior to said electrolyte treatment.

2. The process of claim 1 wherein said lower aliphatic alcohol is methanol.

References Cited

UNITED STATES PATENTS

| | | | |
|---|---|---|---|
| 2,394,688 | 2/1946 | Heyman | 8—4 |
| 2,563,469 | 8/1951 | Jennings | 96—77 |
| 2,606,835 | 8/1952 | Jennings | 96—77 |
| 2,636,420 | 4/1953 | Ryan et al. | 117—33.3X |
| 2,892,382 | 6/1959 | Ryan et al. | 8—4X |
| 2,892,383 | 6/1959 | Walworth et al. | 8—4X |

WILLIAM D. MARTIN, Primary Examiner

M. R. P. PERRONE, Jr., Assistant Examiner

U.S. Cl. X.R.

8—4; 117—47, 63, 145